US008054010B2

(12) United States Patent
Takata

(10) Patent No.: US 8,054,010 B2
(45) Date of Patent: Nov. 8, 2011

(54) DISPLAY DEVICE ILLUMINATING DEVICE AND DISPLAY DEVICE PROVIDED WITH THE ILLUMINATING DEVICE

(75) Inventor: Yoshiki Takata, Suzuka (JP)

(73) Assignee: Sharp Kabushiki Kaisha, Osaka (JP)

( * ) Notice: Subject to any disclaimer, the term of this patent is extended or adjusted under 35 U.S.C. 154(b) by 547 days.

(21) Appl. No.: 12/297,495

(22) PCT Filed: Mar. 5, 2007

(86) PCT No.: PCT/JP2007/054151
§ 371 (c)(1),
(2), (4) Date: Oct. 17, 2008

(87) PCT Pub. No.: WO2008/015805
PCT Pub. Date: Feb. 7, 2008

(65) Prior Publication Data
US 2009/0122519 A1    May 14, 2009

(30) Foreign Application Priority Data

Aug. 3, 2006   (JP) .................................. 2006-212132

(51) Int. Cl.
*H05B 37/00*   (2006.01)
*H01J 11/00*   (2006.01)
*H01J 1/88*    (2006.01)
(52) U.S. Cl. .......................... 315/312; 313/607; 313/268
(58) Field of Classification Search .................. 315/312; 313/234, 268, 473, 475, 483–494, 422, 581–582, 313/594, 634, 607, 514–515, 519, 631, 633
See application file for complete search history.

(56) References Cited

U.S. PATENT DOCUMENTS

| | | | | |
|---|---|---|---|---|
| 7,432,669 B2 * | 10/2008 | Ahn et al. | ...................... | 315/312 |
| 7,638,945 B2 * | 12/2009 | Takata | .......................... | 313/607 |
| 2003/0214478 A1 | 11/2003 | Yoo et al. | | |
| 2006/0197424 A1 | 9/2006 | Takata | | |

FOREIGN PATENT DOCUMENTS

| | | |
|---|---|---|
| JP | 2004-039264 A | 2/2004 |
| JP | 2004-227864 A | 8/2004 |
| WO | WO 2006051698 A1 * | 5/2006 |

OTHER PUBLICATIONS

Official Communication issued in International Patent Application No. PCT/JP2007/054151, mailed on Apr. 17, 2007.

* cited by examiner

*Primary Examiner* — Shawki S Ismail
*Assistant Examiner* — Thienvu Tran
(74) *Attorney, Agent, or Firm* — Keating & Bennett, LLP

(57) ABSTRACT

An illuminating device for a display device includes a tube lamp which can be driven in parallel by power supplied from a power supply device through a first power supply member and a second power supply member; the first power supply member; and the second power supply member. The illuminating device is provided with illuminating sections whose equivalent circuit is a serially connected body having capacitors connected to the both ends of a negative resistance. The illuminating sections are driven in parallel by separating them into two systems. A voltage to be applied to the left end of the illuminating sections which belong to the first system, and a voltage to be applied to the left end of the illuminating sections which belong to the second system are permitted to be in opposite phases, and a voltage to be applied to the right end of the illuminating sections which belong to the first system and a voltage to be applied to the right end of the illuminating sections which belong to the second system are permitted to be in opposite phases. Thus, display noise of the display device can be reduced.

10 Claims, 5 Drawing Sheets

DISPLAY DEVICE ILLUMINATING DEVICE AND DISPLAY DEVICE PROVIDED WITH THE ILLUMINATING DEVICE

BACKGROUND OF THE INVENTION

1. Field of the Invention

The present invention relates to a display device illuminating device, and to a display device. More particularly, the present invention relates to a display device illuminating device, and a display device, that is provided with a plurality of lamps that can be driven in parallel.

2. Description of the Related Art

Common cold cathode lamps used as light sources for display devices have a non-linear negative impedance characteristic, and therefore cannot be driven in parallel. Typically, each cold cathode lamp is provided with a separate power supply circuit. Inconveniently, however, this configuration, requiring as many power supply circuits as there are cold cathode lamps, is costly, and also is disadvantageous in terms of size reduction, weight reduction, and cost reduction.

Moreover, common cold cathode lamps used as light sources for display devices are connected to power supply circuits via harnesses (also called leads) and connectors, and therefore their fitting is troublesome, resulting in poor assembly efficiency with display device illuminating devices employing cold cathode lamps; likewise their removal also is troublesome, resulting in poor replacement efficiency on occasions of replacement of cold cathode lamps, and in poor disassembly efficiency on occasions of discarding of display device illuminating devices employing cold cathode lamps.

Lamps that are free from such inconveniences are external electrode fluorescent lamps (EEFLs) (see, e.g., JP-A-2004-31338 and JP-A-2004-39264), and so are the cold cathode lamps for which the present applicant applied for a patent (see Patent Document 3 listed below).

An external electrode fluorescent lamp is, in terms of an equivalent circuit, a serial circuit composed of a negative resistance and a capacitor connected to each end of it, and thus has a non-linear positive impedance characteristic. External electrode fluorescent lamps can therefore be driven in parallel. On the other hand, a circuit including a cold cathode lamp disclosed in WO 2006/051698 A1, a first power feeding member, and a second power feeding member, the cold cathode lamp being fed with electric power from a power supply device via the first and second power feeding member, is, in terms of an equivalent circuit, a serial circuit composed of a negative resistance and a capacitor connected to at least one end of it, and thus has a non-linear positive impedance characteristic. The cold cathode lamp disclosed in WO 2006/051698 A1 can therefore be driven in parallel.

As discussed above, these lamps can be driven in parallel, with the end portions of the lamps pinched in, under the resilience of holding members made of a resilient metal material (e.g. spring steel). Thus, the lamps can be fed with electric power via the holding members. Conveniently, this construction makes fitting and removal of lamps easy.

The illuminating sections disclosed in WO 2006/051698 A1 will be described. WO 2006/051698 A1 discloses a cold cathode lamp, a first power feeding member, and a second power feeding member, the cold cathode lamp being fed with electric power from a power supply device via the first and second power feeding members, and that is, in terms of an equivalent circuit, a serial circuit composed of a negative resistance, a capacitor connected to one end of the negative resistance, and another capacitor connected to the other end of the negative capacitance.

In a display device illuminating device incorporated in a display device and having a plurality of illuminating sections each of which includes a cold cathode lamp, a first power feeding member, and a second power feeding member, the cold cathode lamp being fed with electric power from a power supply device via the first and second power feeding members, and is, in terms of an equivalent circuit, a serial circuit composed of a negative resistance, a capacitor connected to one end of the negative resistance, and another capacitor connected to the other end of the negative capacitance, adopting a configuration as shown in FIG. 7 in which the equivalent circuits 21 to 24 of those illuminating sections are connected, in parallel with one another, to a power supply device 25 and in which the voltage output from one end of the power supply device 25 and the voltage output from the other end of the power supply device 25 are opposite in phase helps make zero as a whole the power supply noise that enters the display panel via the parasitic capacitance between the display panel and the power supply lines for the illuminating sections.

Inconveniently, however, when attention is focused on one end—call it the first end—of the power supply device 25, all of the illuminating sections receive a voltage of the same phase; thus power supply noise may enter the portion of the display panel corresponding to the first end of the power supply device 15 via a parasitic capacitance, causing display noise. Likewise, when attention is focused on the other end—call it the second end—of the power supply device 25, all of the illuminating sections receive a voltage of the same phase (though opposite to the phase at the first end of the power supply device 25); thus power supply noise may enter the portion of the display panel corresponding to the second end of the power supply device 25 via a parasitic capacitance, causing display noise. In this way, even when the power supply noise that enters the display panel is made zero as a whole, in reality, display noise may appear locally, leading to degraded display quality.

SUMMARY OF THE INVENTION

To overcome the above inconveniences, preferred embodiments of the present invention provide a illuminating device for a display device that can reduce display noise on a display device, and provide a display device provided with such a display device illuminating device.

A display device illuminating device according to a preferred embodiment of the present invention includes a plurality of illuminating sections, each of which includes a tube lamp arranged to be driven in parallel, a first power feeding member, and a second power feeding member, the tube lamp being fed with electric power from a power supply device via the first and second power feeding members, and is, in terms of an equivalent circuit, a serial circuit including a negative resistance with a capacitor connected to at least one end thereof. Here, the plurality of illuminating sections are arranged side by side in the direction perpendicular or substantially perpendicular to the main axis of the tube lamps, and the plurality of illuminating sections arranged side by side in the direction perpendicular or substantially perpendicular to the main axis of the tube lamps are grouped into two, a first and a second, channels so as to be driven in parallel in each channel separately. Moreover, the voltage applied to the end portions, located in a first direction along the main axis, (e.g. the left end portions) of the illuminating sections belonging to the first channel and the voltage applied to the end portions, located in the first direction along the main axis, (e.g. the left end portions) of the illuminating sections belonging to the second channel are opposite in phase (i.e., in a phase relationship such that, compared with when those voltages are identical in phase, the sum of the voltage noise appearing at the end portions, located in the first direction along the main axis, of the plurality of illuminating sections arranged side by side in the direction perpendicular or substantially perpendicular to the main axis of the tube lamps is reduced), and the voltage applied to the end portions, located in a second direction, opposite to the first direction, along the main axis, (e.g., the right end portions) of the illuminating sections belonging to the first channel and the voltage applied to the end portions, located in the second direction along the main axis, (e.g., the right end portions) of the illuminating sections belonging to the second channel are opposite in phase (i.e., in a phase relationship such that, compared with when those voltages are identical in phase, the sum of the voltage noise appearing at the end portions, located in the second direction along the main axis, of the plurality of illuminating sections arranged side by side in the direction perpendicular to the main axis of the tube lamps is reduced).

With this configuration, it is possible to reduce, compared with the conventional configuration (FIG. 7), the sum of the voltage noise appearing at the end portions, located in the first direction along the main axis, (e.g. the left end portions) of the plurality of illuminating sections arranged side by side in the direction perpendicular or substantially perpendicular to the main axis of the tube lamps and also the sum of the voltage noise appearing at the end portions, located in the second direction along the main axis, (e.g. the right end portions) of the plurality of illuminating sections arranged side by side in the direction perpendicular or substantially perpendicular to the main axis of the tube lamps. Thus, in a display device incorporating a display device illuminating device according to a preferred embodiment of the present invention, it is possible to prevent degraded display quality due to locally appearing display noise.

A display device illuminating device according to a preferred embodiment of the present invention includes a plurality of illuminating sections, each of which includes a tube lamp arranged to be driven in parallel, a first power feeding member, and a second power feeding member, the tube lamp being fed with electric power from a power supply device via the first and second power feeding members, and is, in terms of an equivalent circuit, a serial circuit including a negative resistance with a capacitor connected to at least one end thereof. Here, the plurality of illuminating sections are arranged side by side in the direction perpendicular or substantially perpendicular to the main axis of the tube lamps, and the plurality of illuminating sections arranged side by side in the direction perpendicular or substantially perpendicular to the main axis of the tube lamps are grouped into two, a first and a second, channels so as to be driven in parallel in each channel separately. Moreover, the voltage applied to the end portions, located in a first direction along the main axis, (e.g., the left end portions) of the illuminating sections belonging to the first channel and the voltage applied to the end portions, located in the first direction along the main axis, (e.g., the left end portions) of the illuminating sections belonging to the second channel are opposite in phase (i.e., in a phase relationship such that, compared with when those voltages are identical in phase, the sum of the voltage noise appearing at the end portions, located in the first direction along the main axis, of the plurality of illuminating sections arranged side by side in the direction perpendicular to the main axis of the tube lamps is reduced), and the voltage applied to the end portions, located in a second direction, opposite to the first direction, along the main axis, (e.g., the right end portions) of the illuminating sections belonging to the first channel and the voltage applied to the end portions, located in the second direction along the main axis, (e.g., the right end portions) of the illuminating sections belonging to the second channel are at a ground potential.

With this configuration, it is possible to reduce, compared with the conventional configuration (FIG. 7), the sum of the voltage noise appearing at the end portions, located in the first direction along the main axis, (e.g., the left end portions) of the plurality of illuminating sections arranged side by side in the direction perpendicular or substantially perpendicular to the main axis of the tube lamps and also the sum of the voltage noise appearing at the end portions, located in the second direction along the main axis, (e.g., the right end portions) of the plurality of illuminating sections arranged side by side in the direction perpendicular or substantially perpendicular to the main axis of the tube lamps. Thus, in a display device incorporating a display device illuminating device according to a preferred embodiment of the present invention, it is possible to prevent degraded display quality due to locally appearing display noise.

In either of the display device illuminating devices described above, it is preferable that the number of illuminating sections belonging to the first channel and the number of illuminating sections belonging to the second channel be equal.

With this configuration, it is possible to reduce, ideally down to zero, the sum of the voltage noise appearing at the end portions, located in the first direction along the main axis, of the plurality of illuminating sections arranged side by side in the direction perpendicular or substantially perpendicular to the main axis of the tube lamps and also the sum of the voltage noise appearing at the end portions, located in the second direction along the main axis, of the plurality of illuminating sections arranged side by side in the direction perpendicular or substantially perpendicular to the main axis of the tube lamps.

It is preferable that the illuminating sections belonging to the first channel and the illuminating sections belonging to the second channel be arranged alternately every predetermined number of illumination sections in the direction perpendicular or substantially perpendicular to the main axis. Furthermore, it is preferable that the predetermined number be one.

With these configurations, it is possible to narrow the region in which the voltage noise can be canceled, and thereby to more reliably prevent the appearance of display noise.

A display device (e.g., a television receiver) according to another preferred embodiment of the present invention includes any of the display device illuminating devices described above.

According to various preferred embodiments of the present invention, it is possible to realize a display device illuminating device that can reduce display noise on a display device, and to realize a display device provided with such a display device illuminating device.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Preferred embodiments of the present invention will be described below with reference to the accompanying drawings. A display device illuminating device according to a preferred embodiment of the present invention includes a plurality of illuminating sections, each of which includes a tube lamp arranged to be driven in parallel, a first power feeding member, and a second power feeding member, the tube lamp being fed with electric power from a power supply device via the first and second power feeding members, and in terms of an equivalent circuit, includes a negative resistance with a capacitor connected to at least one end of it. In addition to these illuminating sections, the display device illuminating device according to a preferred embodiment of the present invention further includes an optical sheet and an illuminating unit, the first and second power feeding members being provided on the illuminating unit, the cold cathode lamp being fitted on the front surface of the illuminating unit, the optical sheet covering the front surface, having the cold cathode lamp fitted on it, of the illuminating unit.

A description will now be given of examples of the construction of the illuminating sections provided in the display device illuminating device according to a preferred embodiment of the present invention.

Figure 4A:
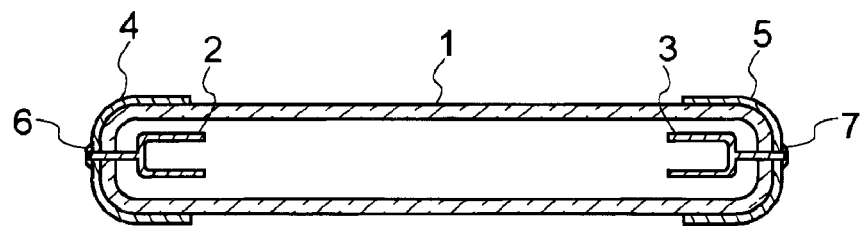
FIG. 4A and FIG. 4B are diagrams showing an example of the construction of an illuminating section provided in a display device illuminating device according to a preferred embodiment of the present invention.
Figure 4B:
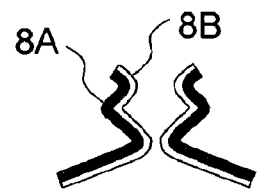

In one example of the construction of the illuminating sections provided in the display device illuminating device according to a preferred embodiment of the present invention, there are provided: a cold cathode lamp having a sectional structure as shown in FIG. 4A; and a first and a second power feeding member each as shown in FIG. 4B.

The cold cathode lamp shown in FIG. 4A has internal electrodes 2 and 3 inside a glass tube 1. A portion of each of the internal electrodes 2 and 3 penetrates and protrudes out of the glass tube 1 to function as an electrode terminal. In this structure, the interior of the glass tube 1 is air-tight. The inner wall of the glass tube 1 is coated with a fluorescent substance. Inside the air-tight glass tube 1 are sealed in, typically, neon and argon in a ratio of, for example, approximately 95:5, 80:20, etc., such that the overall pressure inside the glass tube 1 is about $10.7 \times 10^3$ to $5.3 \times 10^3$ Pa ($\approx 80$ to 40 Torr), for example, and in addition several milligrams of mercury. Instead of mercury, xenon may be sealed in.

In the cold cathode lamp shown in FIG. 4A, an external terminal 4 is provided on an internal electrode 2-side end portion of the glass tube 1, and the protruding portion of the internal electrode 2 and the external terminal 4 are soldered together with solder 6; an external terminal 5 is provided on an internal electrode 3-side end portion of the glass tube 1, and the protruding portion of the internal electrode 3 and the external terminal 5 are soldered together with solder 7. Specific implementations of the external terminals 4 and 5 include metal paste, metal foil, metal caps, etc. As long as the electrical connection between the protruding portion of the internal electrode 2 and the external terminal 4 is sufficiently secured, the solder 6 may be omitted. As long as the electrical connection between the protruding portion of the internal electrode 3 and the external terminal 5 is sufficiently secured, the solder 7 may be omitted.

The power feeding member shown in FIG. 4B is a resilient metal member 8A coated with an insulating layer 8B. This power feeding member, when used as the first power feeding member, pinches, under the resilience of the resilient metal member 8A, the external terminal 4 of the cold cathode lamp shown in FIG. 4A and, when used as the second power feeding member, pinches, under the resilience of the resilient metal member 8A, the external terminal 5 of the cold cathode lamp shown in FIG. 4A. The insulating layer 8B, with which the resilient metal member 8A is coated, has simply to be formed such that the resilient metal member 8A and the external terminal 4 do not make direct contact with each other.

As an alternative to the structure shown in FIG. 4B, an implementation is possible in which an electrically conductive member that does not make contact with the external terminal 4 of the cold cathode lamp is used as the first power feeding member, an electrically conductive member that does not make contact with the external terminal 5 of the cold cathode lamp is used as the second power feeding member, and the illuminating unit is provided with a holder that holds the cold cathode lamp such that the external terminal 4 of the cold cathode lamp and the first power feeding member define a capacitor and that the external terminal 5 of the cold cathode lamp and the second power feeding member define a capacitor. This implementation, however, has the disadvantage that the electrode-to-electrode distance of the capacitor defined by the external terminal 4 of the cold cathode lamp and the first power feeding member and the electrode-to-electrode distance of the capacitor defined by the external terminal 5 of the cold cathode lamp and the second power feeding member are unstable, and the disadvantages that electric discharge is likely to occur between the external terminal 4 of the cold cathode lamp and the first power feeding member and between the external terminal 5 of the cold cathode lamp and the second power feeding member. The structure shown in FIG. 4B is therefore preferable.

Figure 5A:
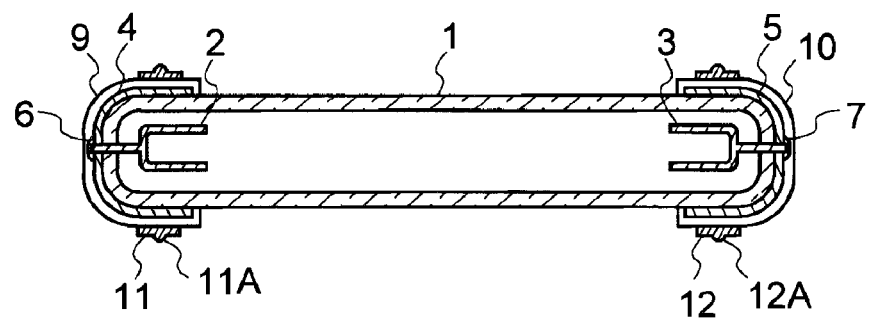
FIG. 5A and FIG. 5B are diagrams showing another example of the construction of an illuminating section provided in a display device illuminating device according to a preferred embodiment of the present invention.
Figure 5B:
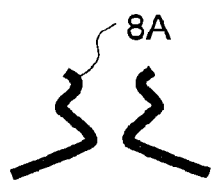

In another example of the construction of the illuminating sections provided in the display device illuminating device according to a preferred embodiment of the present invention, there are provided: a cold cathode lamp having a sectional structure as shown in FIG. 5A; and a first and a second power feeding member each as shown in FIG. 5B. Such parts shown in FIGS. 5A and 5B as find their counterparts in FIGS. 4A and 4B are identified by common reference signs, and no detailed description of them will be repeated.

In the cold cathode lamp shown in FIG. 5A, an insulating layer 9 is disposed on the external terminal 4, and an insulating layer 10 is disposed on the external terminal 5; a stripring-shaped counter electrode 11 is disposed on the insulating layer 9, and a strip-ring-shaped counter electrode 12 is disposed on the insulating layer 10. The entire external terminal 4 is covered by the glass tube 1 and the insulating layer 9, and the entire external terminal 5 is covered by the glass tube 1 and the insulating layer 10.

Furthermore, in the cold cathode lamp shown in FIG. 5A, to ensure electrical connection between the counter electrode 11 and the first power feeding member shown in FIG. 5B, a ring-shaped projection 11A is formed on the strip-ring-shaped counter electrode 11, and, to ensure electrical connection between the counter electrode 12 and the second power feeding member shown in FIG. 5B, a ring-shaped projection 12A is formed on the strip-ring-shaped counter electrode 12.

The power feeding member shown in FIG. 5B is a resilient metal member 8A. This power feeding member, when used as the first power feeding member, pinches, under the resilience of the resilient metal member 8A, the projection 11A of the cold cathode lamp shown in FIG. 5A and, when used as the second power feeding member, pinches, under the resilience of the resilient metal member 8A, the projection 12A of the cold cathode lamp shown in FIG. 5A.

Instead of the cold cathode lamp shown in FIG. 5A, an external electrode fluorescent lamp may be used.

Figure 1A:
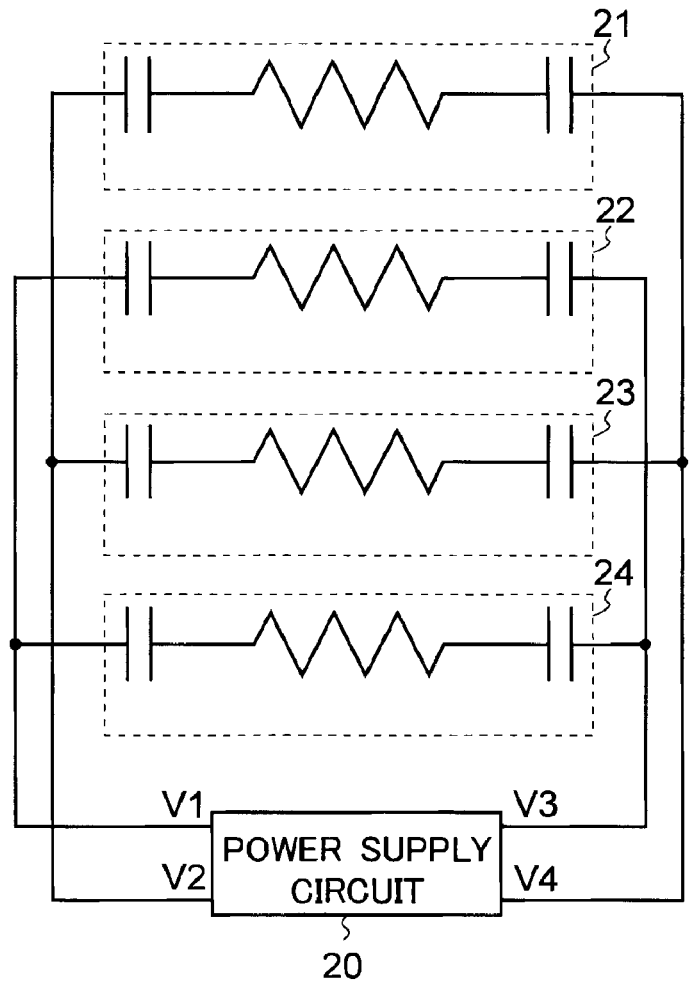
FIG. 1A is a diagram showing an example of the equivalent circuit of a display device illuminating device according to a preferred embodiment of the present invention.

In terms of an equivalent circuit, the illuminating sections of either of the two examples described above are each a serial circuit including a negative resistance, a capacitor connected to one end of the negative resistance, and another capacitor connected to the other end of the negative resistance. An example of the electrical configuration of a display device illuminating device according to a preferred embodiment of the present invention which is provided with four such illuminating sections is shown in FIG. 1A.

Figure 1B:
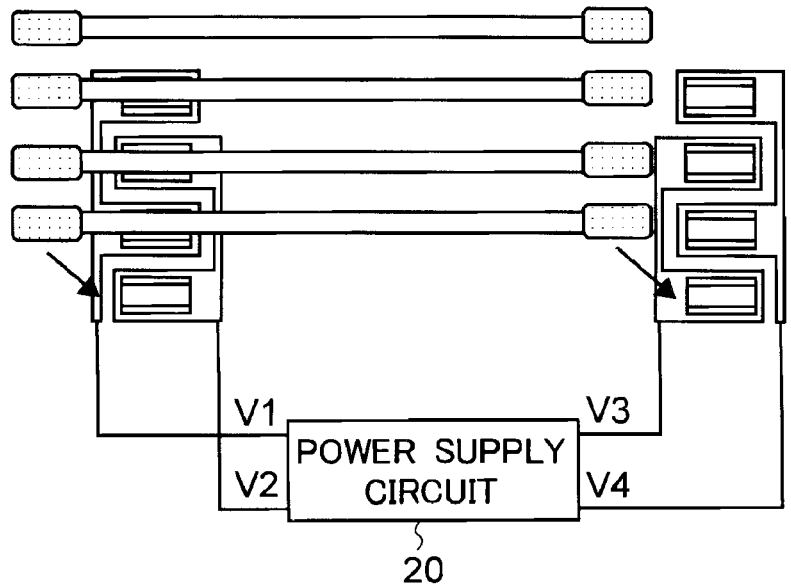
FIG. 1B is a diagram showing an outline of the construction of a display device illuminating device according to a preferred embodiment of the present invention.

In the display device illuminating device according to a preferred embodiment of the present invention, the plurality of illuminating sections (in FIG. 1A, their equivalent circuits 21 to 24 are shown) arranged side by side in the direction perpendicular or substantially perpendicular to the main axis of the tube lamps are grouped into two, a first and a second, channels so as to be driven in parallel in each channel separately. An outline of the construction corresponding to the electrical configuration shown in FIG. 1A is shown in FIG. 1B.

The equivalent circuits 22 and 24 belonging to the first channel receives, at their left end, a voltage V1 from a power supply device 20, and the equivalent circuits 21 and 23 belonging to the second channel receives, at their left end, a voltage V2 from the power supply device 20. The equivalent circuits 22 and 24 belonging to the first channel receives, at their right end, a voltage V3 from a power supply device 20, and the equivalent circuits 21 and 23 belonging to the second channel receives, at their right end, a voltage V4 from the power supply device 20.

Practical implementations of the power supply device 20 include, in a rough classification, one in which it applies high voltages to both ends of each illuminating section, and one in which it applies a high voltage to only one end of each illuminating section.

Figure 2:
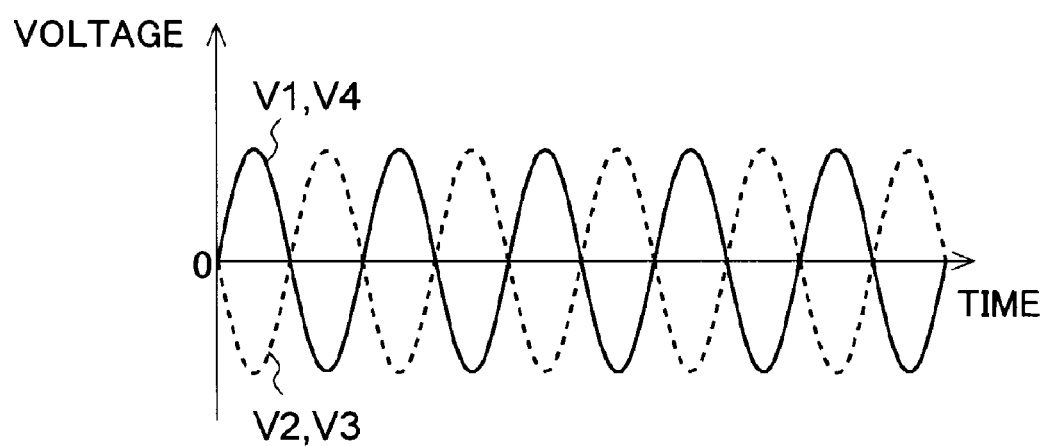
FIG. 2 is a diagram showing an example of the output voltage waveform of a power supply device provided in a display device illuminating device according to a preferred embodiment of the present invention.

First, a description will be given of the implementation in which the power supply device 20 applies high voltages to both ends of each illuminating section. For example, as the voltage waveforms in FIG. 2 show, the power supply device 20 operates such that the voltages V1 to V4 have the same frequency, that the voltages V1 to V4 are in synchronism, that the voltage V1 applied to the left end of the equivalent circuits 22 and 24 belonging to the first channel and the voltage V2 applied to the left end of the equivalent circuits 21 and 23 belonging to the second channel are opposite in phase (i.e. in a phase relationship such that, compared with when the voltages V1 and V2 are identical in phase, the sum of the voltage noise appearing at the left end side of the equivalent circuits 21 to 24 is reduced), and that the voltage V3 applied to the right end of the equivalent circuits 22 and 24 belonging to the first channel and the voltage V4 applied to the right end of the equivalent circuits 21 and 23 belonging to the second channel are opposite in phase (i.e. in a phase relationship such that, compared with when the voltages V3 and V4 are identical in phase, the sum of the voltage noise appearing at the left end side of the equivalent circuits 21 to 24 is reduced). This makes it possible to reduce, ideally down to zero, the sum of the voltage noise appearing at the left end side of the equivalent circuits 21 to 24 and also the sum of the voltage noise appearing at the right end side of the equivalent circuits 21 to 24. In this way, in a display device incorporating a display device illuminating device according to a preferred embodiment of the present invention, it is possible to prevent degraded display quality due to locally appearing display noise.

Figure 3:
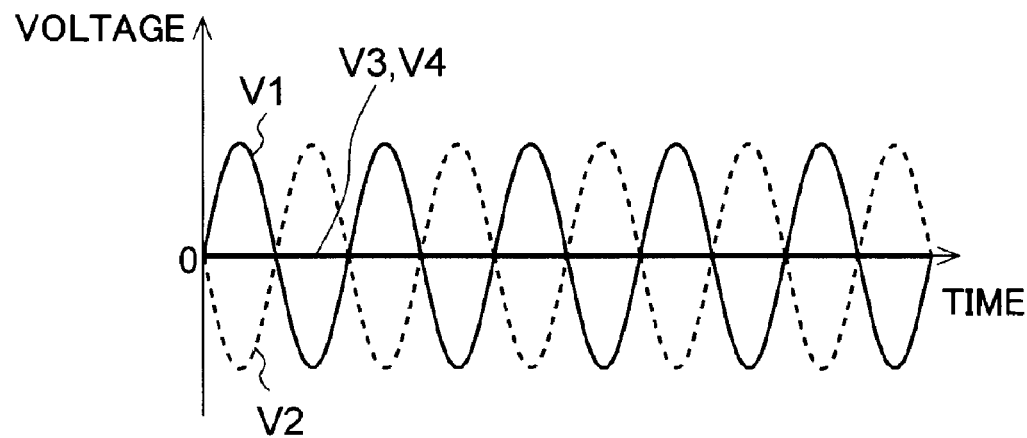
FIG. 3 is a diagram showing another example of the output voltage waveform of a power supply device provided in a display device illuminating device according to a preferred embodiment of the present invention.

Next, a description will be given of the implementation in which the power supply device 20 applies a high voltage to only one end of each illuminating section. For example, as the voltage waveforms in FIG. 3 show, the power supply device 20 operates such that the voltages V1 and V2 have the same frequency, that the voltages V1 and V2 are in synchronism, that the voltage V1 applied to the left end of the equivalent circuits 22 and 24 belonging to the first channel and the voltage V2 applied to the left end of the equivalent circuits 21 and 23 belonging to the second channel are opposite in phase, and that the voltage V3 applied to the right end of the equivalent circuits 22 and 24 belonging to the first channel and the voltage V4 applied to the right end of the equivalent circuits 21 and 23 belonging to the second channel are at the ground potential. This makes it possible to reduce, ideally down to zero, the sum of the voltage noise appearing at the left end side of the equivalent circuits 21 to 24. In this way, in a display device incorporating a display device illuminating device according to a preferred embodiment of the present invention, it is possible to prevent degraded display quality due to locally appearing display noise.

In the example of the electrical configuration shown in FIG. 1A, the lamps belonging to the first channel and the lamps belonging to the second channel are arranged alternately every single lamp in the direction perpendicular or substantially perpendicular to the main axis of the tube lamps, and the number of lamps belonging to the first channel and the number of lamps belonging to the second channel are equal. This makes it possible to narrow down the region in which the voltage noise can be canceled, and thus to prevent appearance of display noise in a narrower region.

In the preferred embodiments described above, the lamps belonging to the first channel and the lamps belonging to the second channel are preferably arranged alternately every single lamp in the direction perpendicular or substantially perpendicular to the main axis of the tube lamps. Instead of alternately every single lamp, they may be arranged alternately every plurality of lamps. In that case, compared with when the lamps are arranged alternately every single lamp, it is not possible to narrow down the region in which the voltage noise can be canceled.

In the preferred embodiments described above, the number of lamps belonging to the first channel and the number of lamps belonging to the second channel preferably are equal. This is not meant to limit the invention in any way; there needs to be at least one lamp belonging to the first channel and at least one lamp belonging to the second channel provided.

Figure 7:
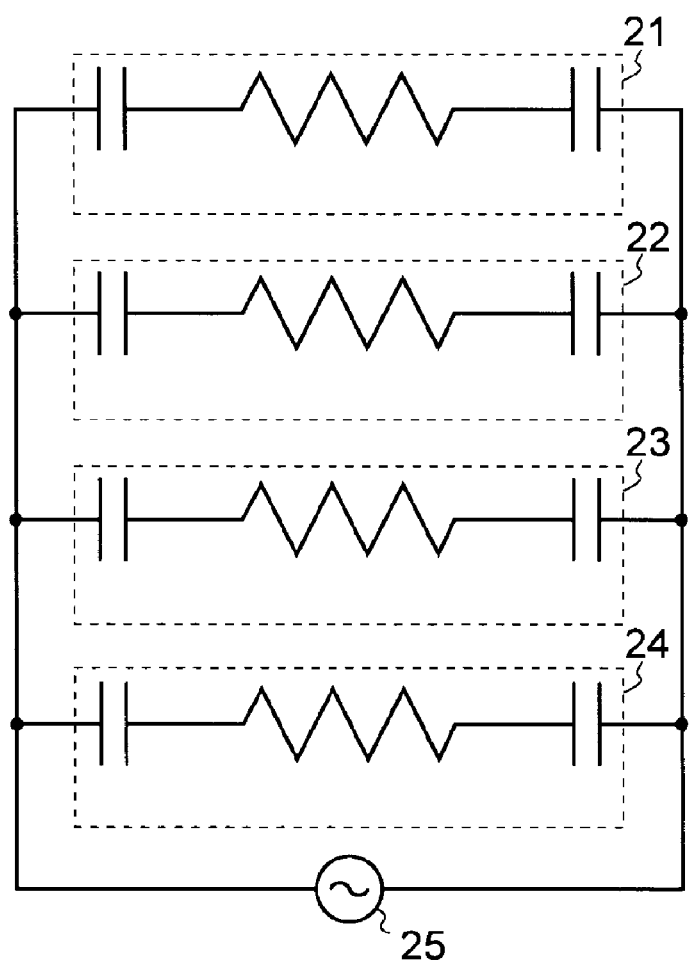
FIG. 7 is a diagram showing an example of the equivalent circuit of a conventional display device illuminating device.

A configuration in which the number of lamps belonging to the first channel and the number of lamps belonging to the second channel are not equal is, compared with a configuration in which they are equal, less effective in reducing the sum of the voltage noise appearing at the left end side of the equivalent circuits 21 to 24 and the sum of the voltage noise appearing at the right end side of the equivalent circuits 21 to 24, but can reduce, more than the configuration shown in FIG. 7, the sum of the voltage noise appearing at the left end side of the equivalent circuits 21 to 24 and also the sum of the voltage noise appearing at the right end side of the equivalent circuits 21 to 24, and thus can reduce display noise in a display device.

In the preferred embodiments described above, an illuminating section preferably is used that is, in terms of an equivalent circuit, a serial circuit including a negative resistance with a capacitor connected to each end of it. The present invention can be applied also in a case where, instead, an illuminating section is used that is, in terms of an equivalent circuit, a serial circuit including a negative resistance with a capacitor connected to only end of it (e.g., an illuminating section including a cold cathode lamp having a sectional structure as shown in FIG. 4A, a first power feeding member structured as shown in FIG. 4B, and a second power feeding member structured as shown in FIG. 5B).

In a display device illuminating device according to a preferred embodiment of the present invention, the plurality of illuminating sections (see FIG. 1) grouped into two channels to be driven in parallel in each channel separately may be provided in a plurality of sets arranged side by side in the direction along the main axis of the lamps. It is thus possible to cope with display devices of larger sizes easily.

A display device according to a preferred embodiment of the present invention includes a display device illuminating device according to a preferred embodiment of the present invention as described above and a display panel. Specific implementations of display devices according to various preferred embodiments of the present invention include transmissive liquid crystal display devices employing a display device illuminating device according to a preferred embodiment of the present invention as a backlight unit and having a display panel provided on the front surface thereof.

Figure 6:
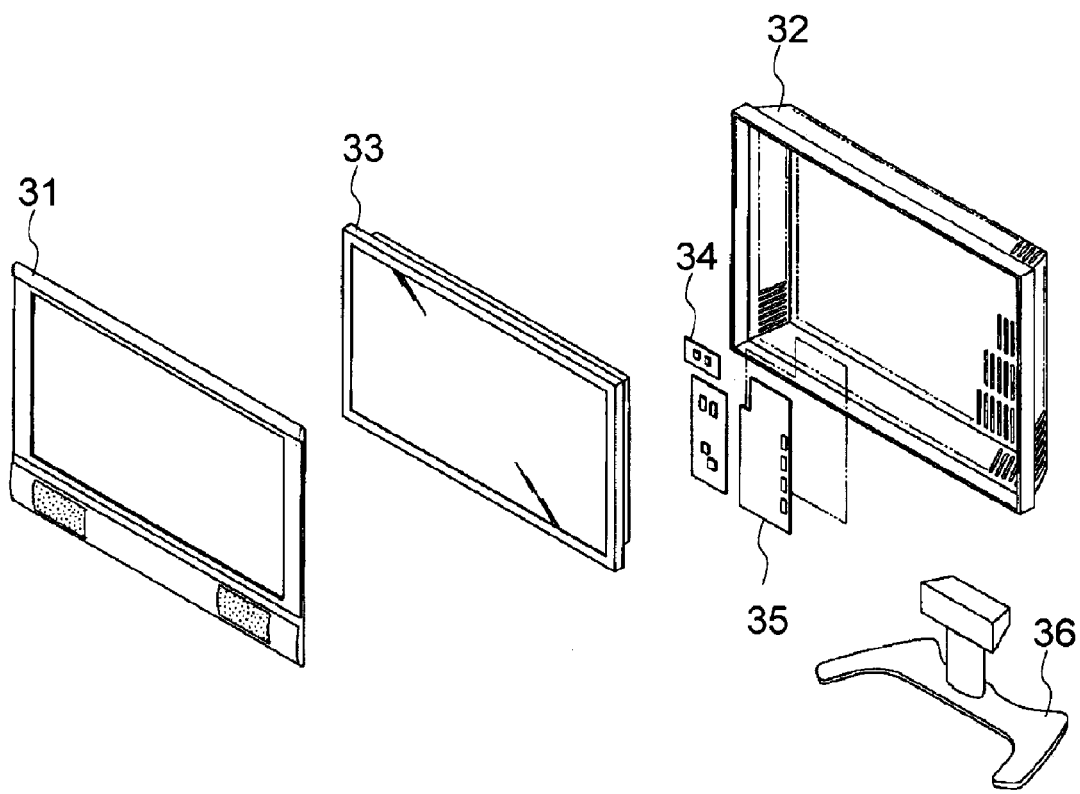
FIG. 6 is an exploded perspective view of a liquid crystal television receiver, as an example of a display device according to a preferred embodiment of the present invention.

An example of an exploded perspective view of a display device according to a preferred embodiment of the present invention in a case where it is a liquid crystal television receiver is shown in FIG. 6. Between a front cabinet 31 and a back cabinet 32, there are housed a transmission liquid crystal display unit 33, a tuner 34, and a power supply 35, and the back cabinet 32 is supported by a stand 36. The liquid crystal display unit 33 includes a display device illuminating device according to a preferred embodiment of the present invention as a backlight unit, and has a liquid crystal display panel provided on the front surface of it.

Display device illuminating devices according to a preferred embodiment of the present invention find applications as a variety of devices for display devices, including backlights for liquid crystal television receivers.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. An illuminating device for a display device, comprising:
a plurality of illuminating sections each including:
a tube lamp arranged to be driven in parallel;
a first power feeding member; and
a second power feeding member; wherein
the tube lamp is arranged to be fed with electric power from a power supply device via the first and second power feeding members; and
the illuminating sections each comprising an equivalent circuit, the equivalent circuit including a serial circuit including a negative resistance with a capacitor connected to at least one end thereof; wherein
the plurality of illuminating sections are arranged side by side in a direction that is substantially perpendicular to a main axis of the tube lamps;
the plurality of illuminating sections arranged side by side in the direction that is substantially perpendicular to the main axis of the tube lamps are grouped into two, a first and a second, channels so as to be driven in parallel in each channel separately;
a first voltage applied to end portions, located in a first direction along the main axis, of the illuminating sections belonging to the first channel and a second voltage applied to end portions, located in the first direction along the main axis, of the illuminating sections belonging to the second channel are opposite in phase; and
a third voltage applied to end portions, located in a second direction, opposite to the first direction, along the main axis, of the illuminating sections belonging to the first channel and a fourth voltage applied to end portions, located in the second direction along the main axis, of the illuminating sections belonging to the second channel are opposite in phase.

2. An illuminating device for a display device, comprising:
a plurality of illuminating sections each including:
a tube lamp arranged to be driven in parallel;
a first power feeding member; and
a second power feeding member; wherein
the tube lamp is arranged to be fed with electric power from a power supply device via the first and second power feeding members; and
the illuminating sections each comprising an equivalent circuit, the equivalent circuit including a serial circuit including a negative resistance with a capacitor connected to at least one end thereof; wherein
the plurality of illuminating sections are arranged side by side in a direction that is substantially perpendicular to a main axis of the tube lamps;
the plurality of illuminating sections arranged side by side in the direction that is substantially perpendicular to the main axis of the tube lamps are grouped into two, a first and a second, channels so as to be driven in parallel in each channel separately;
a first voltage applied to end portions, located in a first direction along the main axis, of the illuminating sections belonging to the first channel and a second voltage applied to end portions, located in the first direction along the main axis, of the illuminating sections belonging to the second channel are opposite in phase; and
a third voltage applied to end portions, located in a second direction, opposite to the first direction, along the main axis, of the illuminating sections belonging to the first channel and a fourth voltage applied to end portions, located in the second direction along the main axis, of the illuminating sections belonging to the second channel are at a ground potential.

3. The illuminating device according to claim 1, wherein a number of illuminating sections belonging to the first channel and a number of illuminating sections belonging to the second channel are equal.

4. The illuminating device according to claim 2, wherein a number of illuminating sections belonging to the first channel and a number of illuminating sections belonging to the second channel are equal.

5. The illuminating device according to claim 3, wherein the illuminating sections belonging to the first channel and the illuminating sections belonging to the second channel are arranged alternately every predetermined number of illumination sections in the direction substantially perpendicular to the main axis.

6. The illuminating device according to claim 4, wherein the illuminating sections belonging to the first channel and the illuminating sections belonging to the second channel are arranged alternately every predetermined number of illumination sections in the direction that is substantially perpendicular to the main axis.

7. The illuminating device according to claim 5, wherein the predetermined number is one.

8. The illuminating device according to claim 6, wherein the predetermined number is one.

9. A display device comprising the illuminating device according to claim 1.

10. The display device according to claim 9, wherein the display device is a television receiver.

* * * * *